US012712996B2

(12) United States Patent
Hu et al.

(10) Patent No.: US 12,712,996 B2
(45) Date of Patent: Aug. 18, 2026

(54) DISPLAY DEVICE, IMAGE PROCESSING METHOD AND ELECTRONIC DEVICE

(71) Applicants: Beijing BOE Technology Development Co., Ltd., Beijing (CN); BOE Technology Group Co., Ltd., Beijing (CN)

(72) Inventors: Feitao Hu, Beijing (CN); Yapeng Li, Beijing (CN); Yuanyuan Ma, Beijing (CN); Yangbing Li, Beijing (CN); Lei Wang, Beijing (CN); Chengming Tan, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/024,861

(22) Filed: Jan. 16, 2025

(65) Prior Publication Data

US 2025/0159125 A1 May 15, 2025

Related U.S. Application Data

(63) Continuation of application No. PCT/CN2023/095133, filed on May 18, 2023.

(51) Int. Cl.
*H04N 13/243* (2018.01)
*G02F 1/13357* (2006.01)
(Continued)

(52) U.S. Cl.
CPC ..... *H04N 13/243* (2018.05); *G02F 1/133603* (2013.01); *H04N 13/15* (2018.05);
(Continued)

(58) Field of Classification Search
CPC .. H04N 13/243; H04N 13/257; H04N 13/279; H04N 13/15; H04N 13/254; G02F 1/133603
(Continued)

(56) References Cited

U.S. PATENT DOCUMENTS

2007/0247573 A1* 10/2007 Ouderkirk ......... G02F 1/133621 349/114
2017/0351138 A1* 12/2017 Han .................. G02F 1/133504
2019/0068900 A1* 2/2019 Kapinos ................. H04N 23/20

FOREIGN PATENT DOCUMENTS

CN 101477273 A 7/2009
CN 105898287 A 8/2016
(Continued)

OTHER PUBLICATIONS

The Translation of WO2012070273.*
(Continued)

*Primary Examiner* — Thai Q Tran
(74) *Attorney, Agent, or Firm* — XSENSUS LLP

(57) ABSTRACT

The present disclosure relates to a display device, including an LCD screen, wherein the LCD screen includes a back-light source provided with a plurality of zones; each zone is provided with visible light sources; and at least one zone is provided with infrared light sources; wherein the infrared light sources are configured to emit infrared light having different bands, and the infrared light of the different bands, after irradiating an object, is collected by a multispectral infrared camera and used for three-dimensional reconstruction of the object based on a photometric stereo method.

14 Claims, 11 Drawing Sheets

(51) Int. Cl.
*H04N 13/15* (2018.01)
*H04N 13/254* (2018.01)
*H04N 13/257* (2018.01)
*H04N 13/279* (2018.01)

(52) U.S. Cl.
CPC ......... *H04N 13/254* (2018.05); *H04N 13/257* (2018.05); *H04N 13/279* (2018.05)

(58) Field of Classification Search
USPC ............................................................ 348/47
See application file for complete search history.

(56) References Cited

FOREIGN PATENT DOCUMENTS

| | | | | |
|---|---|---|---|---|
| CN | 206235783 U | 6/2017 | | |
| CN | 109521605 A | 3/2019 | | |
| CN | 111294582 A | 6/2020 | | |
| CN | 110097634 B | 9/2022 | | |
| JP | 2000059822 A | 2/2000 | | |
| JP | 2011065411 A | 3/2011 | | |
| WO | WO-2012070273 A1 * | 5/2012 | ............. | G06F 21/84 |

OTHER PUBLICATIONS

International Search Report mailed on Sep. 8, 2023, received for PCT Application PCT/CN2023/095133, filed on May 18, 2023, 6 pages including English Translation.

Written Opinion mailed on Sep. 8, 2023, received for PCT Application PCT/CN2023/095133, filed on May 18, 2023, 8 pages including English Translation.

* cited by examiner

DISPLAY DEVICE, IMAGE PROCESSING METHOD AND ELECTRONIC DEVICE

CROSS-REFERENCE TO RELATED APPLICATION

The present application is a Continuation Application of PCT International Application No. PCT/CN2023/095133 filed on May 18, 2023, the entire content of which is incorporated herein by reference.

TECHNICAL FIELD

The present disclosure relates to the field of three-dimensional imaging technology, and specifically relates to a display device, an image processing method and device, an electronic device, and a storage medium.

BACKGROUND

The accurate acquisition of three-dimensional information of an object is crucial for the three-dimensional reconstruction and 3D display of the object. Currently, commonly used visual methods for three-dimensional information acquisition include TOF vision method, structured light vision method, and stereo vision method. The TOF vision method has low accuracy. The structured light vision method has a complex system and high cost. The binocular vision method relies on feature point matching, and incorrect depths will appear in places lacking texture and features. Thus, an error may occur in the 3D reconstructed object.

It should be noted that the information disclosed in the Background section is only used to enhance understanding of the background of the present disclosure, and therefore may include information that does not constitute prior art known to those of ordinary skill in the art.

SUMMARY

According to a first aspect of the present disclosure, a display device is provided, including an LCD screen. The LCD screen includes a backlight source provided with a plurality of zones. Each zone is provided with visible light sources. At least one zone is provided with infrared light sources.

In an exemplary embodiment of the present disclosure, each zone is provided with infrared light sources, and the infrared light sources in one zone have a different infrared band compared with the infrared light sources in another zone.

In an exemplary embodiment of the present disclosure, the infrared light sources in one zone have a different light source direction compared with the infrared light sources in another zone.

In an exemplary embodiment of the present disclosure, the zones of the backlight source are arranged in a polygonal structure.

In an exemplary embodiment of the present disclosure, a multispectral infrared camera and/or a color camera are provided outside the LCD screen.

According to an aspect of the present disclosure, an image processing method is provided, the method including:

- identifying a viewpoint area on a LCD screen of a user, where a backlight source of the LCD screen is provided with infrared light sources in at least one zone;
- calling a combination of cameras corresponding to the viewpoint area to perform image acquisition, where the combination of cameras includes a color camera and/or a multispectral infrared camera, and the acquired image includes at least one frame of color image acquired by each camera; and
- calling a respective method according to the number of directions of the infrared light sources to reconstruct a normal vector, for performing a three-dimensional reconstruction of an object based on the normal vector.

In an exemplary embodiment of the present disclosure, the combination of cameras includes several multispectral infrared cameras.

The method further includes:

- extracting image channel information from the acquired multi-frame color image based on the band information of the infrared light sources; and calculating the normal vector using a photometric stereo algorithm based on the extracted image channel information.

In an exemplary embodiment of the present disclosure, the combination of cameras includes several color cameras and multispectral infrared cameras.

The method further includes:

- extracting image channel information from the acquired multi-frame color image based on the band information of the infrared light sources; and calculating the normal vector using a photometric stereo algorithm based on the extracted image channel information.

In an exemplary embodiment of the present disclosure, the combination of cameras includes several color cameras.

The method further includes:

- calling the combination of cameras corresponding to the viewpoint area to perform image acquisition for acquiring a color image;
- acquiring a second image in an infrared mode by other cameras;
- extracting image channel information from the acquired color image and second image according to the band information of the infrared light sources; and
- calculating the normal vector using a shadow recovery algorithm based on the extracted image channel information.

According to an aspect of the present disclosure, there is provided a computer-readable storage medium on which a computer program is stored. When the computer program is executed by a processor, the image processing method described in any of the foregoing embodiments is implemented.

According to an aspect of the present disclosure, an electronic device is provided, including: a processor; and a memory for storing executable instructions for the processor. The processor is configured to perform the image processing method described in any of the foregoing embodiments when executing the executable instructions.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and together with the description, serve to explain the principle of the present disclosure. It is noted that the drawings in the following description are only some embodiments of the present disclosure. For those of ordinary skill in the art, other drawings can be obtained based on these drawings without exerting creative efforts. In the attached drawings.

DETAILED DESCRIPTION OF THE EMBODIMENTS

Figure 1:
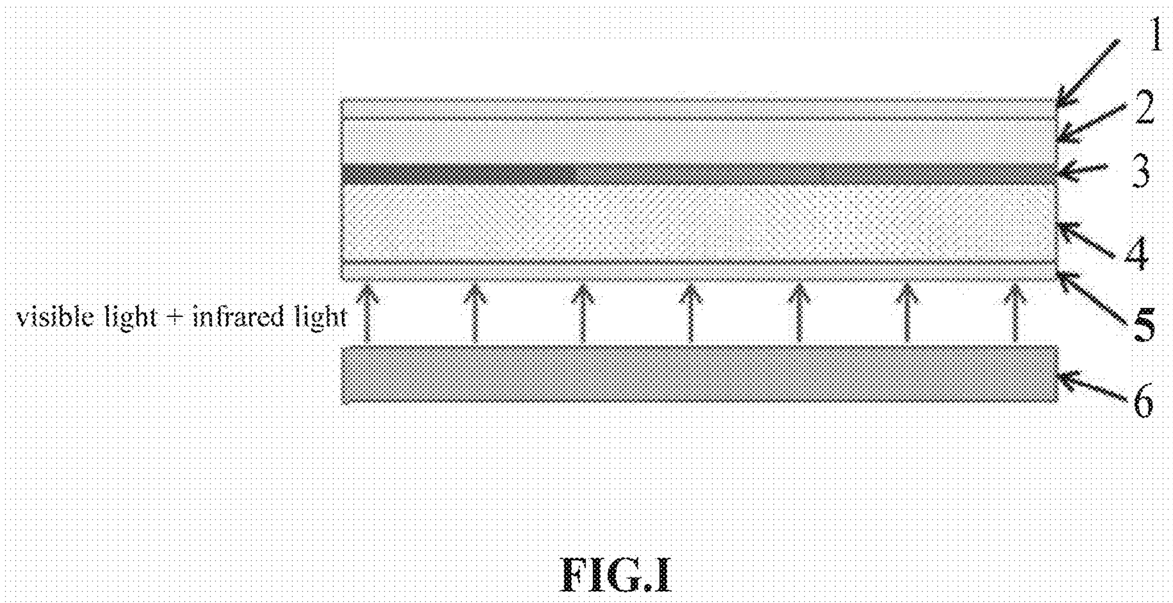
FIG. 1 schematically shows a schematic diagram of an LCD screen structure according to an example embodiment of the present disclosure.

Example embodiments will now be described more fully with reference to the accompanying drawings. Example embodiments may, however, be embodied in various forms and should not be construed as limited to the examples set forth herein. Rather, these embodiments are provided so that the present disclosure will be thorough and complete, and will fully convey the concept of the example embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings represent the same or similar parts, and thus their repeated description will be omitted. Some of the block diagrams shown in the drawings are functional entities, and do not necessarily correspond to physically or logically separate entities. These functional entities may be implemented in software forms, or implemented in one or more hardware modules or integrated circuits, or implemented in different networks and/or processor devices and/or microcontroller devices.

Figure 2:
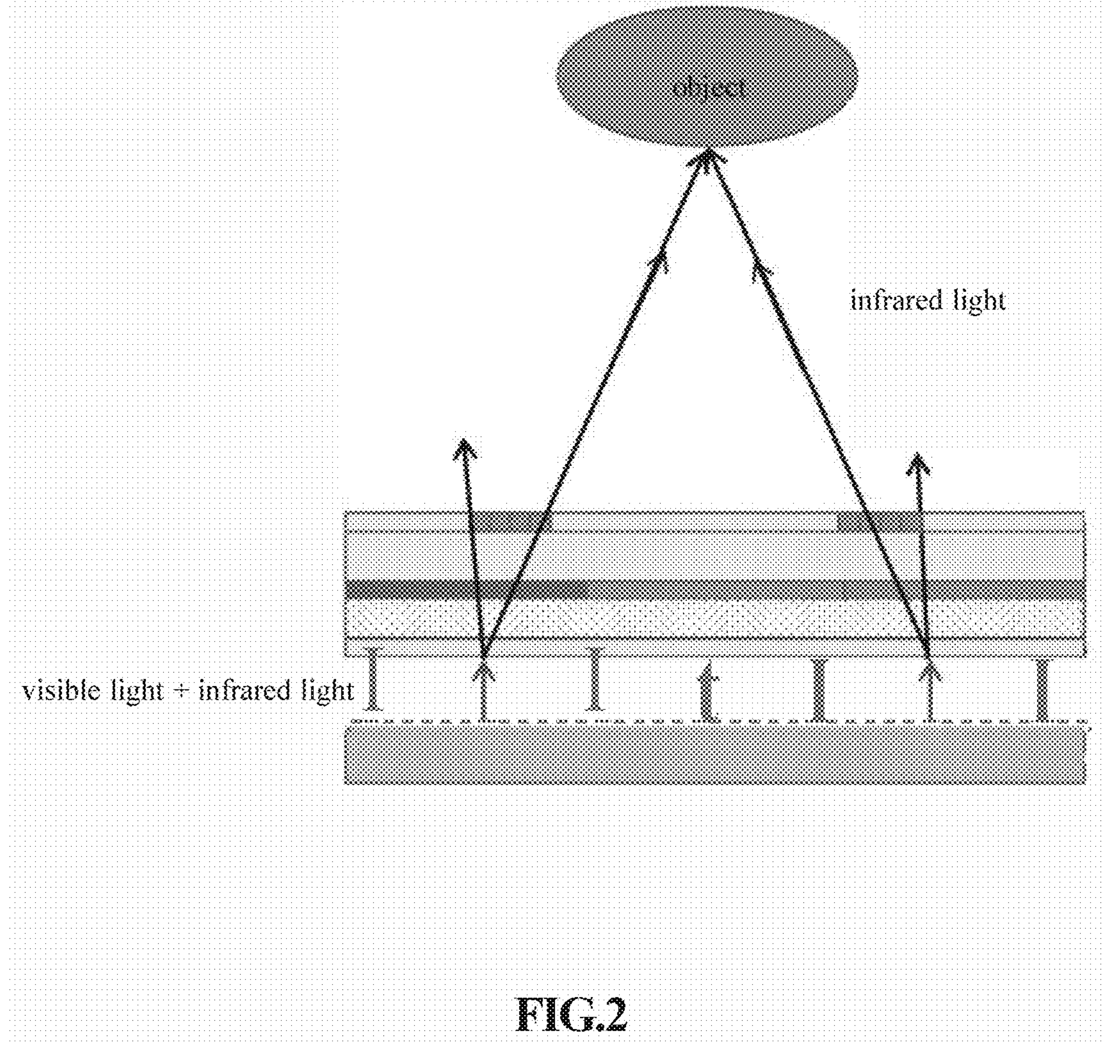
FIG. 2 schematically shows a schematic diagram of an imaging optical path according to an example embodiment of the present disclosure.
Figure 3:
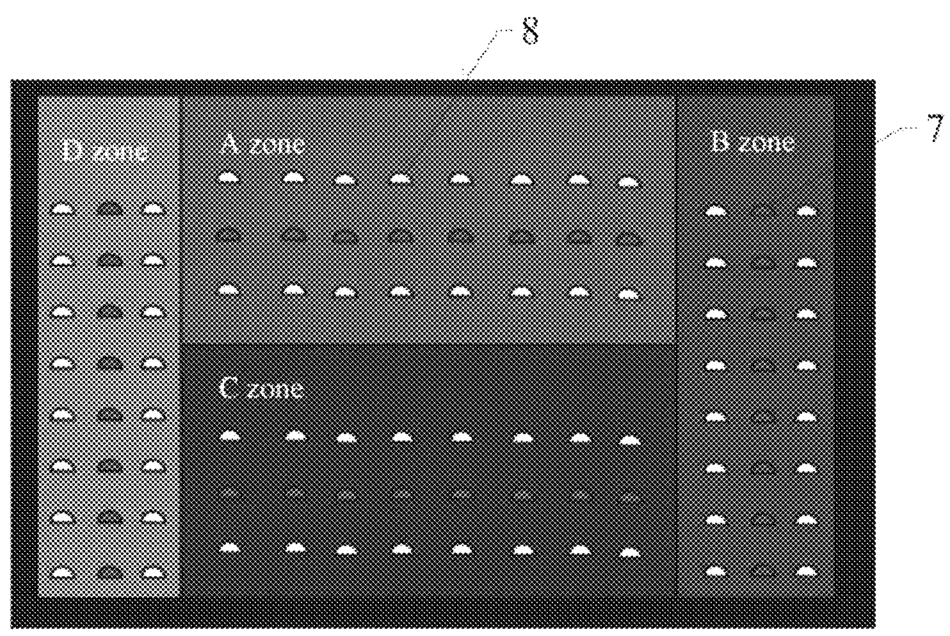
FIG. 3 schematically shows a schematic diagram of zones of a backlight source according to an exemplary embodiment of the present disclosure.

In view of the shortcomings and deficiencies of the existing technology, an example implementation provides a display device, including an LCD screen. Referring to FIG. 1, the LCD screen includes an upper polarizer 1, a glass substrate 2, a color filter 3, a liquid crystal molecule layer 4, a lower polarizer 5, and a backlight plate 6 arranged in sequence from the top layer to the bottom layer. The backlight panel may be divided into multiple zones. For example, it may be divided into at least three zones, and the zones may be arranged in a polygonal structure. For example, as shown in FIG. 3, when four zones are set up, zones A and C are set in the first direction, and zones B and D are set in the second direction. Each zone is connected end to end to form a quadrilateral structure. In each zone, infrared light sources 7 and visible light sources 8 are arranged. The infrared light source uses an infrared lamp bead to emit infrared light. The number of the visible light sources is greater than the number of the infrared light sources. The visible light sources are arranged surrounding the infrared light sources. For the zones, the infrared band used in one zone is different from that in another zone. Referring to FIG. 2, the infrared light sources in one zone have a different light source direction compared with the infrared light sources in another zone.

Figure 4:
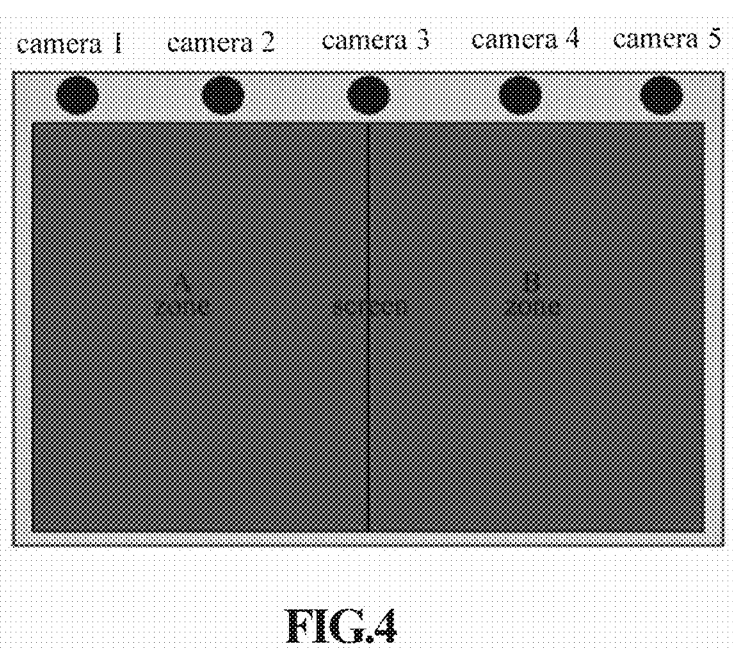
FIG. 4 schematically shows a schematic diagram of a camera arrangement in an exemplary embodiment of the present disclosure.
Figure 5:
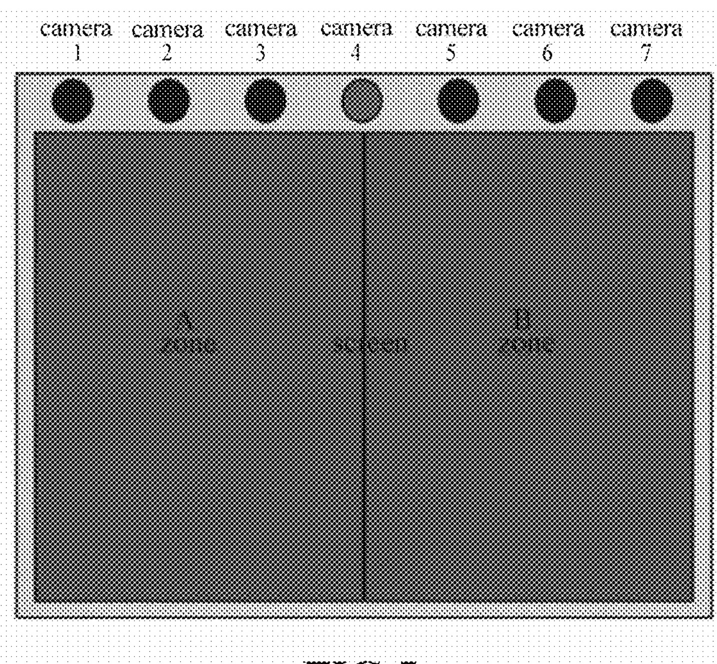
FIG. 5 schematically shows a schematic diagram of another camera arrangement in an exemplary embodiment of the present disclosure.
Figure 6:
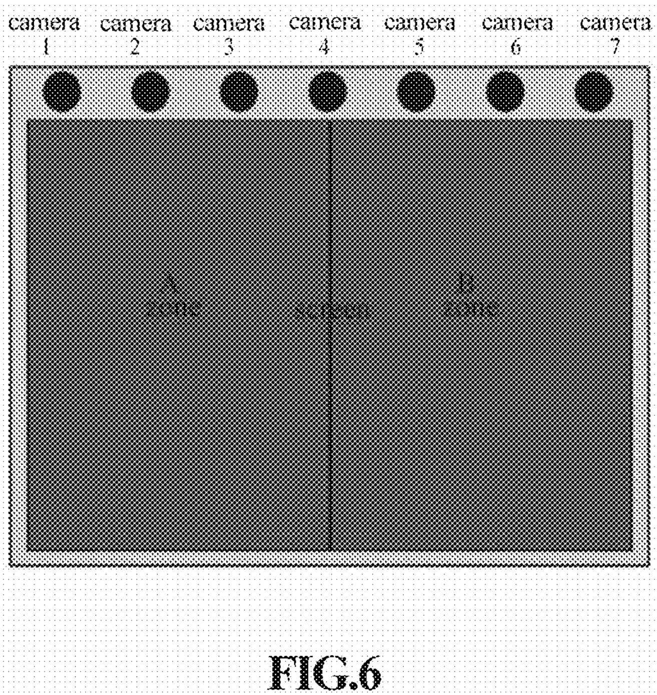
FIG. 6 schematically shows a schematic diagram of yet another camera arrangement in an exemplary embodiment of the present disclosure.

In an example implementation, a multispectral infrared camera and/or a color camera are provided outside the LCD screen. For example, as shown in FIG. 4, five multispectral cameras may be evenly arranged above the screen. Alternatively, as shown in FIG. 5, seven cameras may be evenly arranged above the screen, where camera 4 uses a spectral infrared camera, and the remaining cameras are color cameras. Alternatively, as shown in FIG. 6, seven color cameras may be evenly arranged above the screen.

Figure 8:
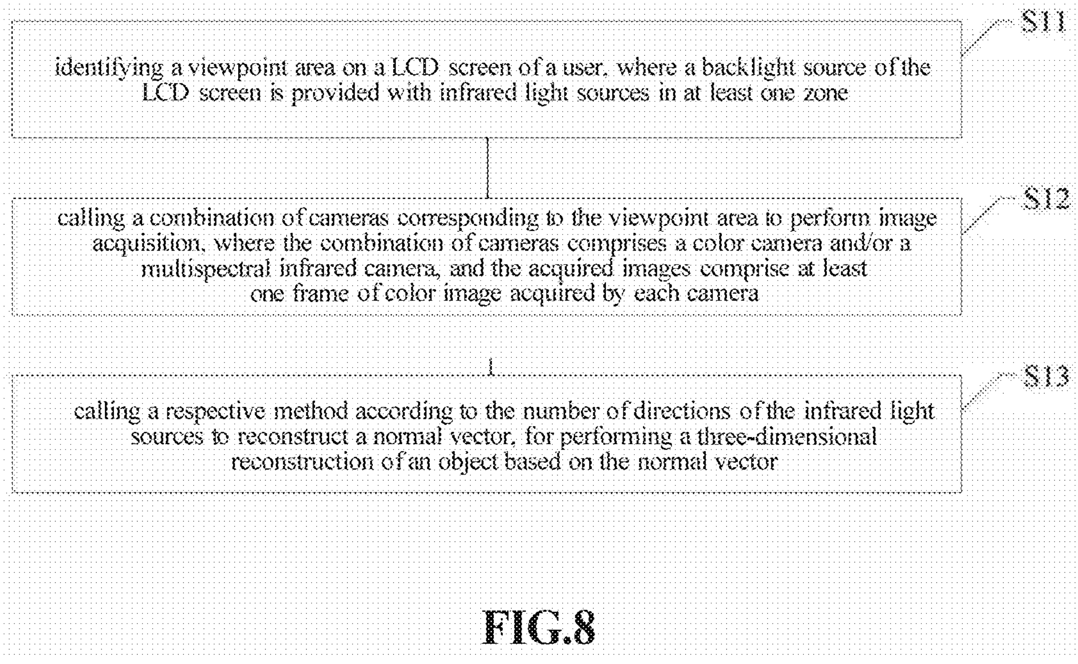
FIG. 8 schematically shows a schematic diagram of an image processing method in an exemplary embodiment of the present disclosure.

An example implementation provides an image processing method, which may be applied to the above display device. Referring to FIG. 8, the above method may include the following steps.

In step S11, the viewpoint area on the LCD screen of a user is identified, where the backlight source of the LCD screen is provided with infrared light sources in at least one zone.

In step S12, the combination of cameras corresponding to the viewpoint area is called to perform image acquisition, where the combination of cameras includes a color camera and/or a multispectral infrared camera, and the acquired image includes at least one frame of color image acquired by each camera.

In step S13, a respective method is called according to the number of directions of the infrared light sources to reconstruct the normal vector, so as to perform a three-dimensional reconstruction of the object based on the normal vector.

The image processing method provided by an example embodiment is to set infrared light sources of different bands and directions in zones on the backlight source of the LCD screen. When performing image acquisition, a color camera and/or a multispectral infrared camera may be used to acquire images, thereby obtaining the RGB channel and the image channel information corresponding to the infrared band. Then, different algorithms may be used for reconstruction of the normal vector.

In the following, each step of the image processing method in an exemplary embodiment will be described in more detail with reference to the accompanying drawings and embodiments.

In step 511, the viewpoint area on the LCD screen of the user is identified, where the backlight source of the LCD screen is provided with infrared light sources in at least one zone.

In an example implementation, an eye tracking camera may be provided on the LCD screen to identify the viewpoint area of the user's eye attention in front of the LCD screen.

In step 512, the combination of cameras corresponding to the viewpoint area is called to perform image acquisition, where the combination of cameras includes a color camera and/or a multispectral infrared camera, and the acquired image includes at least one frame of color image acquired by each camera.

In an example implementation, the screen may be divided into two zones on left and right. As shown in FIG. 4, the two zones are namely zone A and zone B. Each zone may be pre-configured with a respective combination of cameras. For example, the combination of cameras corresponding to zone A may include camera 1, camera 2, and camera 3; and the combination of cameras corresponding to zone B may include camera 3, camera 4, and camera 5. After identifying the user's viewpoint area, each camera in the respective combination of cameras may be activated to perform image acquisition.

In step S13, a respective method is called according to the number of directions of the infrared light sources to reconstruct the normal vector, so as to perform a three-dimensional reconstruction of the object based on the normal vector.

In an example implementation, the combination of cameras includes several multispectral infrared cameras.

The method further includes: extracting image channel information from the acquired multi-frame color image according to band information of the infrared light sources; and calculating the normal vector using a photometric stereo algorithm based on the extracted image channel information.

Specifically, as shown in FIG. 4, five multispectral cameras are used. The zones of the backlight panel are shown in FIG. 3, including four infrared light sources. The respective use is normal vector reconstruction based on a photometric stereo method.

The camera uses a multispectral filter array camera to simultaneously capture infrared light sources and color images in different bands. The schematic diagram of the viewer is shown in FIG. 4. When the viewer's viewpoint is in zone A, cameras 1, 2, and 3 may be selected as acquisition cameras. When the viewer's viewpoint is in zone B, cameras 4, 5, and 6 may be selected as acquisition cameras. The color image of the selected camera and the infrared image of the four bands are separated according to the wavelength information. To synthesize the viewpoint between cameras 1 and 2, firstly the stereoscopic vision principle is used to obtain the parallax images of cameras 1 and 2, and mismatching points in the disparity map are removed based on the stereoscopic vision algorithm. The infrared images of each band obtained by cameras 1 and 2 are used to calculate the normal vector of the object surface in the coordinate system of cameras 1 and 2 based on the photometric stereo principle. The normal vectors of cameras 1 and 2 are respectively fused to compensate for the parallax holes caused by occlusion and weak texture, and an accurate parallax image is obtained. Then, the forward or reverse method is used to synthesize the viewpoint. The same applies to other viewpoints.

The photometric stereo method can obtain the normal vector of an object based on multi-angle illumination images and illumination vectors. The target may be approximated as a Lambert body, and the normal vector may be obtained by the following formula:

$$N_{(i,j)} = \frac{1}{\rho}\left(L^T L\right)^{-1} L I_{(i,j)},$$

where N(i,j) is the normal vector of the object corresponding to the actual point at I(i,j), L is the illumination vector corresponding to the actual point of the object at I(i,j), and ρ is the reflectance of the object surface.

When reconstruction is achieved based on the photometric stereo method, multiple images need to be acquired. A multispectral camera is used to simultaneously acquire color image and infrared image in different bands of the object. Light of different wavelengths is distinguished according to the wavelength. The color image is used to acquire the light field information of the object. Multiple infrared images use the photometric stereo vision method to reconstruct the normal vector of the object. The multispectral camera may be a pixelated multispectral filter array, which can realize multi-channel imaging in a single exposure.

In an example implementation, the combination of cameras includes several color cameras and multispectral infrared cameras.

The method further includes: extracting image channel information from the acquired multi-frame color image according to the band information of the infrared light sources. The zones of the backlight panel are shown in FIG. 3, including 4 infrared light sources. Correspondingly, the photometric stereo method is used according to the extracted image channel information to calculate the normal vector.

Specifically, when the screen is in operation, all infrared light sources and white light are on. The intermediate camera 4 uses a multispectral infrared camera, which together with the infrared light source forms a photometric stereoscopic vision system. After acquiring the image, the wavelength information is used to distinguish the infrared image of each band, and the normal vector of the object surface is obtained based on the photometric stereo principle.

Cameras 1, 2, 3, 5, 6, and 7 are color cameras used to acquire light field information. The schematic diagram of the viewer is shown in FIG. 13. When the viewer's viewpoint is in zone A, cameras 1, 2 and 3 may be selected as acquisition cameras. When the viewer's viewpoint is in zone B, cameras 5, 6 and 7 may be selected as acquisition cameras. To synthesize the viewpoint between cameras 1 and 2, the stereo vision principle is used to obtain disparity maps 1 and 2, and mismatching points are removed according to the stereo vision algorithm to obtain the point cloud in the coordinate system of cameras 1 and 2. After the relationship between the cameras is calibrated, the point cloud is converted to camera 4 and projected to obtain a depth image. The normal vector information of camera 4 is fused to make up for the holes caused by weak textures and occlusions in stereo matching. The filled depth map is converted to a point cloud, and then the point cloud is converted to the original coordinate system and projected to obtain a more accurate parallax image, thereby using the forward or reverse method to synthesize the viewpoint. The same applies to other viewpoints.

In an example implementation, the combination of cameras includes several color cameras.

The method further includes: calling the combination of cameras corresponding to the viewpoint area to perform image acquisition for acquiring a color image; acquiring a second image in an infrared mode by other cameras; extracting image channel information from the acquired color image and second image according to the band information of the infrared light sources; and calculating the normal vector using the shadow recovery algorithm based on the extracted image channel information.

Figure 7:
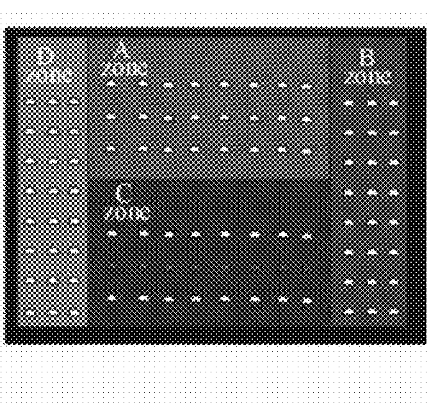
FIG. 7 schematically shows a schematic diagram of zones of a backlight source and arrangement of infrared light sources in an exemplary embodiment of the present disclosure.

Specifically, as shown in FIG. 7, seven color cameras are used. As shown in FIG. 7, the backlight source only contains infrared LEDs in zone C below the screen, and all other zones are provided with visible LEDs. When the screen is in operation, the visible LEDs and the infrared LEDs are always on. When the viewer's viewpoint is in zone A, cameras 1, 2, 3, and 4 may be selected as acquisition cameras. Other cameras work in an infrared mode. When the viewer's viewpoint is in zone B, cameras 4, 5, 6 and 7 may be selected as acquisition cameras, and other cameras work in an infrared mode. After the camera working in the infrared mode acquires the target image, the normal vector of the object is obtained based on the shadow shape recovery method. To synthesize the viewpoint between cameras 1 and 2, the stereo vision principle is used to obtain disparity maps 1 and 2, and mismatching points are removed according to the stereo vision algorithm, to obtain a point cloud in the coordinate system of cameras 1 and 2. After the relationship between the cameras is calibrated, the point cloud is converted to cameras 5, 6, and 7 and projected to obtain a depth image. The normal vector information is fused to make up for the holes caused by weak textures and occlusions in stereo matching. The filled depth map is converted to a point cloud, and then the point cloud is converted to the original coordinate system and projected to obtain a more accurate parallax image, thereby using the forward or reverse method to synthesize the viewpoint. The same applies to other viewpoints.

The shadow recovery shape method can achieve object reconstruction using a single frame image. If the target reflectance is assumed to be known, the infrared mode of the color camera can achieve reconstruction of the normal vector of the object through a single infrared light source and the introduction of other constraints. The specific principle is as follows:

$$E(x, y) = I(x, y)\rho\frac{(p*p_i + q*q_i + 1)}{\sqrt{p^2 + q^2 + 1}\sqrt{p_i^2 + q_i^2 + 1}}$$

where E(x,y) is the pixel gray value, I(x,y) is the illumination intensity in the image, ρ is the reflectance of the object surface, $(p_i,q_i,-1)^T$ is the illumination vector, and $(p,q,-1)^T$ is the normal vector of the surface.

The image processing method provided by an embodiment of the present disclosure is suitable for three-dimensional reconstruction of an LCD screen. The screen uses a backlight source that emits visible light and infrared light bands. The backlight source is divided into multiple zones, and each zone has a different wavelength of infrared light. Visible light is used for display, while infrared light sources of different bands and a single camera form a photometric stereo vision system or a shade recovery shape vision system. By installing multiple multispectral cameras around the screen, color images and infrared images of different bands are acquired for the object. The color images acquired by multiple cameras realize three-dimensional reconstruction of the object based on stereoscopic vision. Infrared images in different wavelength bands from a single camera achieve reconstruction of the normal vector based on a photometric stereo method or a shade recovery shape method. Visual information acquisition may be performed while displaying. By using different algorithms when acquiring different images, and using the photometric stereo method to reflect the three-dimensional topography of the object surface through the intensity of light reflection at different depths, a high-detail, pixel-level reconstruction of the object can be achieved. The fusion of global information from stereo vision and detailed information from photometric stereo enables 3D reconstruction of the object with rich details.

It should be noted that the above-mentioned drawings are only schematic illustrations of processes included in the methods according to exemplary embodiments of the present invention, and are not intended to be limiting. It is readily understood that the processes shown in the above figures do not indicate or limit the temporal sequence of these processes. In addition, it is also easy to understand that these processes may be performed synchronously or asynchronously in multiple modules, for example.

It should be noted that although several modules or units of device for action execution are mentioned in the above detailed description, this division is not mandatory. In fact, according to embodiments of the present disclosure, the features and functions of two or more modules or units described above may be embodied in one module or unit. Conversely, the features and functions of one module or unit described above may be further divided and embodied by multiple modules or units.

The flowcharts and block diagrams in the figures illustrate the architectures, functionalities, and operations of possible implementations of systems, methods, and computer program products according to various embodiments of the present invention. In this regard, each block in the flowchart or block diagrams may represent a module, a program segment, or portion of code that contains one or more executable instructions that implement the specified logic functions. It should also be noted that, in some alternative implementations, the functions described in the block may occur out of the order described in the figures. For example, two blocks shown one after another may actually execute substantially in parallel, or they may sometimes execute in the reverse order, depending on the functionality involved. It should also be noted that each block in the block diagram or flowchart illustration, and combinations of blocks in the block diagram or flowchart illustration, may be implemented by dedicated hardware-based systems that perform the specified functions or operations, or may be implemented by a combination of dedicated hardware and computer instructions.

The units involved in embodiments of the present invention may be implemented in software or hardware, and the described units may also be provided in a processor. The names of these units do not constitute any limitation on the unit itself under certain circumstances.

Figure 9:
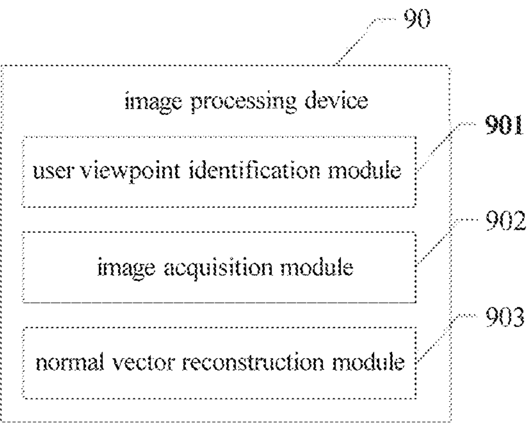
FIG. 9 schematically shows a schematic diagram of an image processing device in an exemplary embodiment of the present disclosure.

In another aspect, the present disclosure also provides an image processing device. Referring to FIG. 9, the image processing device 90 in an exemplary embodiment of the present invention may include a user viewpoint identification module 901, an image acquisition module 902, and a normal vector reconstruction module 903.

The user viewpoint identification module 901 can be used to identify the viewpoint area on the LCD screen of the user. The backlight source of the LCD screen is provided with infrared light sources in at least one zone.

The image acquisition module 902 can be used to call a combination of cameras corresponding to the viewpoint area to perform image acquisition. The combination of cameras includes a color camera and/or a multispectral infrared camera. The acquired image includes at least one frame of color image acquired by each camera.

The normal vector reconstruction module 903 can be used to reconstruct a normal vector by calling a respective method according to the number of directions of the infrared light sources, so as to perform a three-dimensional reconstruction of the object based on the normal vector.

Since each functional module of the image processing device in an embodiment of the present disclosure is the same as that in the above-mentioned embodiment of the image processing method, the details will not be described again here.

Figure 10:
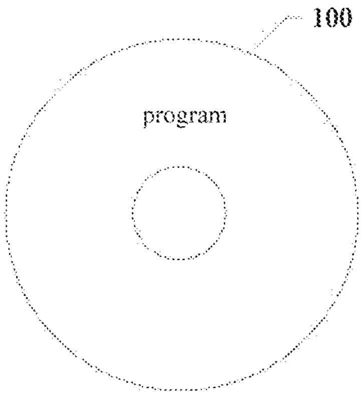
FIG. 10 schematically shows a schematic diagram of a program product in an exemplary embodiment of the present disclosure.

It should be noted that, with reference to FIG. 10, in another aspect, the present disclosure also provides a storage medium. The storage medium may be included in an electronic device, or may exist independently without being assembled into the electronic device. The above-mentioned storage medium carries one or more programs. When the above-mentioned one or more programs are executed by the electronic device, the electronic device is caused to implement the method described in the above embodiments.

It should be noted that the storage medium may be a computer-readable signal medium or a computer-readable storage medium, or any combination of the foregoing two. The computer-readable storage medium may be, for example, but is not limited to, an electrical, magnetic, optical, electromagnetic, infrared, or semiconductor system, apparatus, or device, or any combination thereof. More specific examples of computer readable storage media may include, but are not limited to: an electrical connection having one or more wires, a portable computer disk, a hard drive, Random Access Memory (RAM), Read Only Memory (ROM), Erasable Programmable Read Only Memory (EPROM), flash memory, optical fiber, Compact Disc Read-Only Memory (CD-ROM), optical storage device, magnetic storage device, or any suitable combination of the foegoing. In the present disclosure, the computer-readable storage medium may be any tangible medium that contains or stores a program for use by or in conjunction with an instruction execution system, apparatus, or device. In the present disclosure, the computer-readable signal medium may include a data signal propagated in baseband or as part of a carrier wave, in which computer-readable program codes are carried. Such propagated data signals may take a variety of forms, including but not limited to electromagnetic signals, optical signals, or any suitable combination of the foregoing. The computer-readable signal medium may also be any storage medium other than the computer-readable storage media that can transmit, propagate, or transport a program for use by or in connection with an instruction execution system, apparatus, or device. The program codes contained on the storage medium may be transmitted using any appropriate medium, including but not limited to: wireless, wired, or any suitable combination of the foregoing.

After introducing the storage medium according to an exemplary embodiment of the present disclosure, the electronic device according to an exemplary embodiment of the present disclosure will be described with reference to FIG. 11 in the following.

Figure 11:
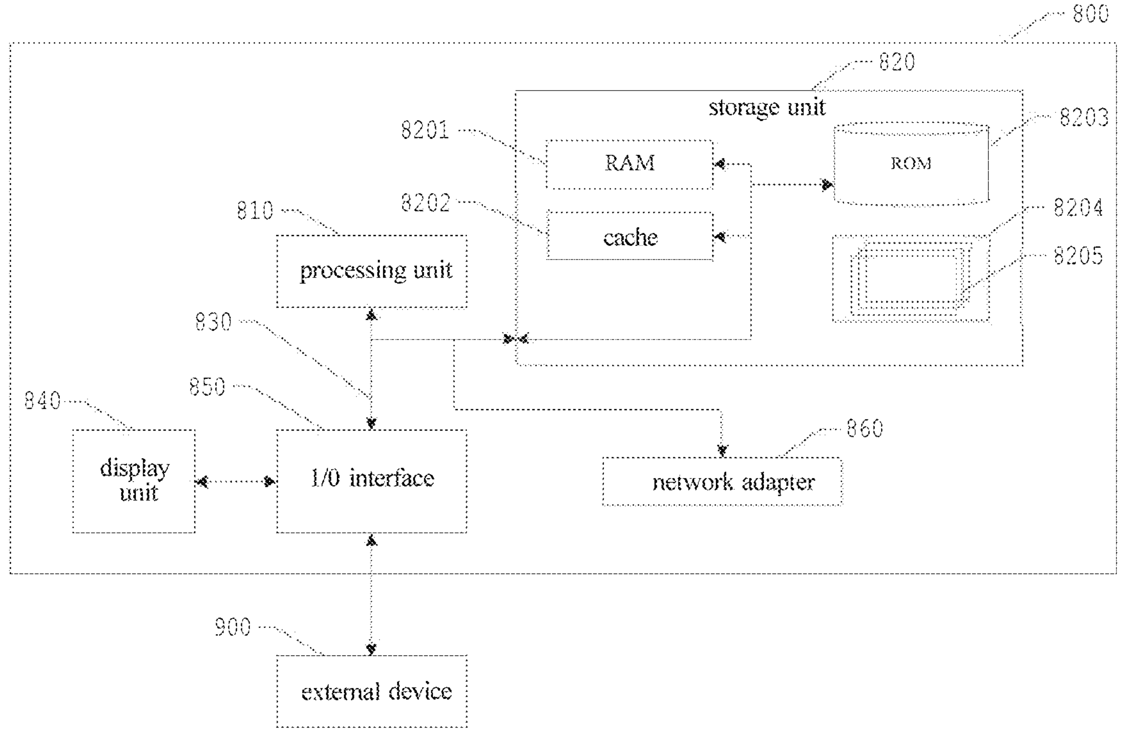
FIG. 11 schematically shows a schematic diagram of an electronic device in an exemplary embodiment of the present disclosure.

The electronic device 800 shown in FIG. 11 is only an example and should not bring any limitation to the functions and scope of use of embodiments of the present disclosure.

As shown in FIG. 11, the electronic device 800 is embodied in the form of a general computing device. The components of the electronic device 800 may include, but are not limited to: the above-mentioned at least one processing unit 810, the above-mentioned at least one storage unit 820, a bus 830 connecting different system components (including the storage unit 820 and the processing unit 810), and the display unit 840.

The storage unit stores program codes and the program codes may be executed by the processing unit 810, so that the processing unit 810 performs steps of various exemplary implementations according to the present disclosure described in the "Example Method" section of this specification. For example, the processing unit 810 may perform steps as shown in FIG. 8.

The storage unit 820 may include a volatile storage unit, such as a random access storage unit (RAM) 8201 and/or a cache storage unit 8202, and may further include a read-only storage unit (ROM) 8203.

The storage unit 820 may also include a program/utility 8204 having a set of (at least one) program modules 8205, including, but not limited to: an operation system, one or more application programs, other program modules, and program data. Each of these examples, or some combination thereof, may include the implementation of a network environment.

The bus 830 may include a data bus, an address bus, and a control bus.

The electronic device 800 may also communicate with one or more external devices 900 (such as keyboard, pointing device, Bluetooth device, etc.), which communication may occur through an input/output (I/O) interface 850. The electronic device 800 also includes a display unit 840 connected to the input/output (I/O) interface 850 for display. Furthermore, the electronic device 800 may also communicate with one or more networks (for example, a local area network (LAN), a wide area network (WAN), and/or a public network, such as the Internet) through a network adapter 860. As shown, the network adapter 860 communicates with other modules of the electronic device 800 via the bus 830. It should be understood that, although not shown in the figures, other hardware and/or software modules may be used in conjunction with the electronic device 800, including but not limited to: microcodes, device drivers, redundant processing units, external disk drive arrays, RAID systems, tape drives, and data backup storage system, etc.

Furthermore, the above-mentioned drawings are only schematic illustrations of processes included in the methods according to exemplary embodiments of the present disclosure, and are not intended to be limiting. It is readily understood that the processes shown in the above figures do not indicate or limit the temporal sequence of these processes. In addition, it is also easy to understand that these processes may be performed synchronously or asynchronously in multiple modules, for example.

Other embodiments of the present disclosure will be readily apparent to those skilled in the art from consideration of the specification and practice of the content disclosed herein. The present application is intended to cover any variations, uses, or adaptations of the present disclosure that follow the general principle of the present disclosure and include common knowledge or customary technical means in the technical field that are not disclosed in the present disclosure. It is intended that the specification and examples be considered as exemplary only, with the true scope and spirit of the present disclosure being indicated by the following claims.

The invention claimed is:

1. A display device, comprising an LCD screen, wherein the LCD screen comprises a backlight source provided with a plurality of zones;

each zone is provided with visible light sources; and at least one zone is provided with infrared light sources;

wherein the infrared light sources are configured to emit infrared light having different bands, and the infrared light of the different bands, after irradiating an object, is collected by a multispectral infrared camera and used for three-dimensional reconstruction of the object based on a photometric stereo method; and wherein the plurality of zones comprises a first zone, a second zone, and a third zone, the first zone comprises a plurality of first infrared light sources configured to emit infrared light having a first band, the second zone comprises a plurality of second infrared light sources configured to emit infrared light having a second band, and the third zone comprises a plurality of third infrared light sources configured to emit infrared light having a third band, wherein the first band, the second band, and the third band are different from each other.

2. The display device according to claim 1, wherein each zone is provided with infrared light sources; and the infrared light sources in one zone have a different infrared band compared with the infrared light sources in another zone.

3. The display device according to claim 2, wherein the infrared light sources in one zone have a different light source direction compared with the infrared light sources in another zone.

4. The display device according to claim 1, wherein the zones of the backlight source are arranged in a polygonal structure.

5. The display device according to claim 1, wherein within the zone, a number of the visible light sources is greater than a number of the infrared light sources, and the visible light sources are arranged surrounding the infrared light sources.

6. The display device according to claim 1, wherein at least one of the multispectral infrared camera or a color camera is provided outside the LCD screen.

7. An image processing method, comprising:

identifying a viewpoint area on a LCD screen of a user, wherein a backlight source of the LCD screen is provided with infrared light sources in at least one zone;

calling a combination of cameras corresponding to the viewpoint area to perform image acquisition, wherein the combination of cameras comprises at least one of a color camera or a multispectral infrared camera, and the acquired image comprises at least one frame of color image acquired by each camera; and calling a respective method according to a number of directions of the infrared light sources to reconstruct a normal vector, for performing a three-dimensional reconstruction of an object based on the normal vector;

wherein the infrared light sources are configured to emit infrared light having different bands, and the infrared light of the different bands, after irradiating the object, is collected by the multispectral infrared camera and used for three-dimensional reconstruction of the object based on a photometric stereo method; and wherein the at least one zone comprises a first zone, a second zone, and a third zone, the first zone comprises a plurality of first infrared light sources configured to emit infrared light having a first band, the second zone comprises a plurality of second infrared light sources configured to emit infrared light having a second band, and the third zone comprises a plurality of third infrared light sources configured to emit infrared light having a third band, wherein the first band, the second band, and the third band are different from each other.

8. The image processing method according to claim 7, wherein the combination of cameras comprises several multispectral infrared cameras; and the method further comprises:

extracting image channel information from the acquired multi-frame color image based on band information of the infrared light sources; and calculating the normal vector using a photometric stereo algorithm based on the extracted image channel information.

9. The image processing method according to claim 7, wherein the combination of cameras comprises several color cameras and multispectral infrared cameras; and the method further comprises:

extracting image channel information from the acquired multi-frame color image based on band information of the infrared light sources; and calculating the normal vector using a photometric stereo algorithm based on the extracted image channel information.

10. The image processing method according to claim 7, wherein the combination of cameras comprises several color cameras; and the method further comprises:

calling the combination of cameras corresponding to the viewpoint area to perform image acquisition for acquiring a color image;

acquiring a second image in an infrared mode by other cameras;

extracting image channel information from the acquired color image and second image according to band information of the infrared light sources; and calculating the normal vector using a shadow recovery algorithm based on the extracted image channel information.

11. An electronic device, comprising:

a processor; and a memory, having executable instructions for the processor stored thereon, wherein the processor is configured to perform an image processing method when executing the executable instructions, and wherein the image processing method comprises:

identifying a viewpoint area on a LCD screen of a user, wherein a backlight source of the LCD screen is provided with infrared light sources in at least one zone;

calling a combination of cameras corresponding to the viewpoint area to perform image acquisition, wherein the combination of cameras comprises at least one of a color camera or a multispectral infrared camera, and the acquired image comprises at least one frame of color image acquired by each camera; and calling a respective method according to a number of directions of the infrared light sources to reconstruct a normal vector, for performing a three-dimensional reconstruction of an object based on the normal vector;

wherein the infrared light sources are configured to emit infrared light having different bands, and the infrared light of the different bands, after irradiating the object, is collected by the multispectral infrared camera and used for three-dimensional reconstruction of the object based on a photometric stereo method; and wherein the at least one zone comprises a first zone, a second zone, and a third zone, the first zone comprises a plurality of first infrared light sources configured to emit infrared light having a first band, the second zone comprises a plurality of second infrared light sources configured to emit infrared light having a second band, and the third zone comprises a plurality of third infrared light sources configured to emit infrared light having a third band, wherein the first band, the second band, and the third band are different from each other.

12. The electronic device according to claim 11, wherein the combination of cameras comprises several multispectral infrared cameras; and the method further comprises:

extracting image channel information from the acquired multi-frame color image based on band information of the infrared light sources; and calculating the normal vector using a photometric stereo algorithm based on the extracted image channel information.

13. The electronic device according to claim 11, wherein the combination of cameras comprises several color cameras and multispectral infrared cameras; and the method further comprises:

extracting image channel information from the acquired multi-frame color image based on band information of the infrared light sources; and calculating the normal vector using a photometric stereo algorithm based on the extracted image channel information.

14. The electronic device according to claim 11, wherein the combination of cameras comprises several color cameras; and the method further comprises:

calling the combination of cameras corresponding to the viewpoint area to perform image acquisition for acquiring a color image;

acquiring a second image in an infrared mode by other cameras;

extracting image channel information from the acquired color image and second image according to band information of the infrared light sources; and calculating the normal vector using a shadow recovery algorithm based on the extracted image channel information.

* * * * *